July 16, 1968  P. J. SOLTIS, JR  3,392,808
CALIPER SUPPORT AND RELEASE MECHANISM
Filed Feb. 13, 1967  4 Sheets-Sheet 1

INVENTOR.
Peter J. Soltis
BY
Harness, Dickey Pierce
ATTORNEYS

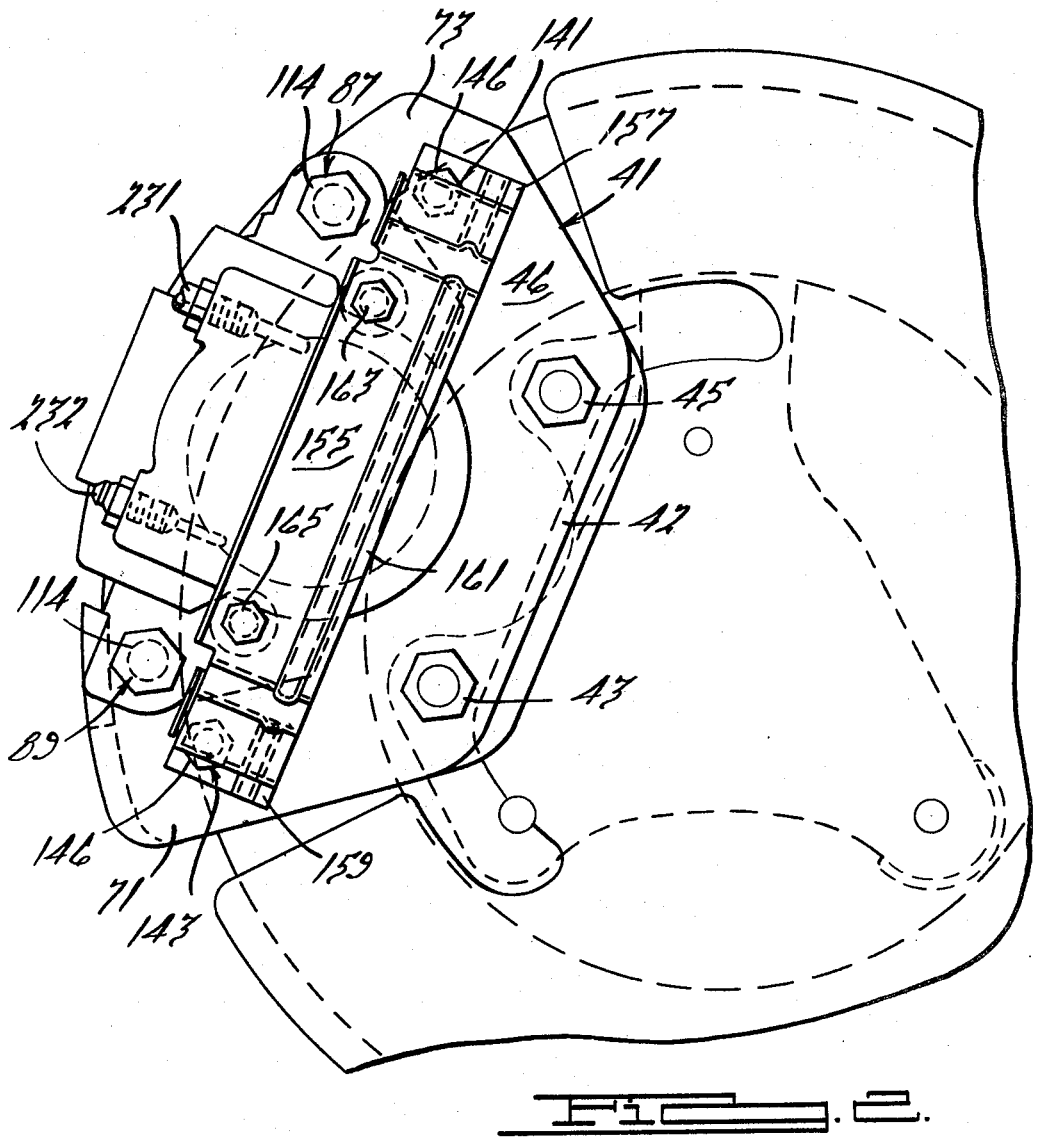

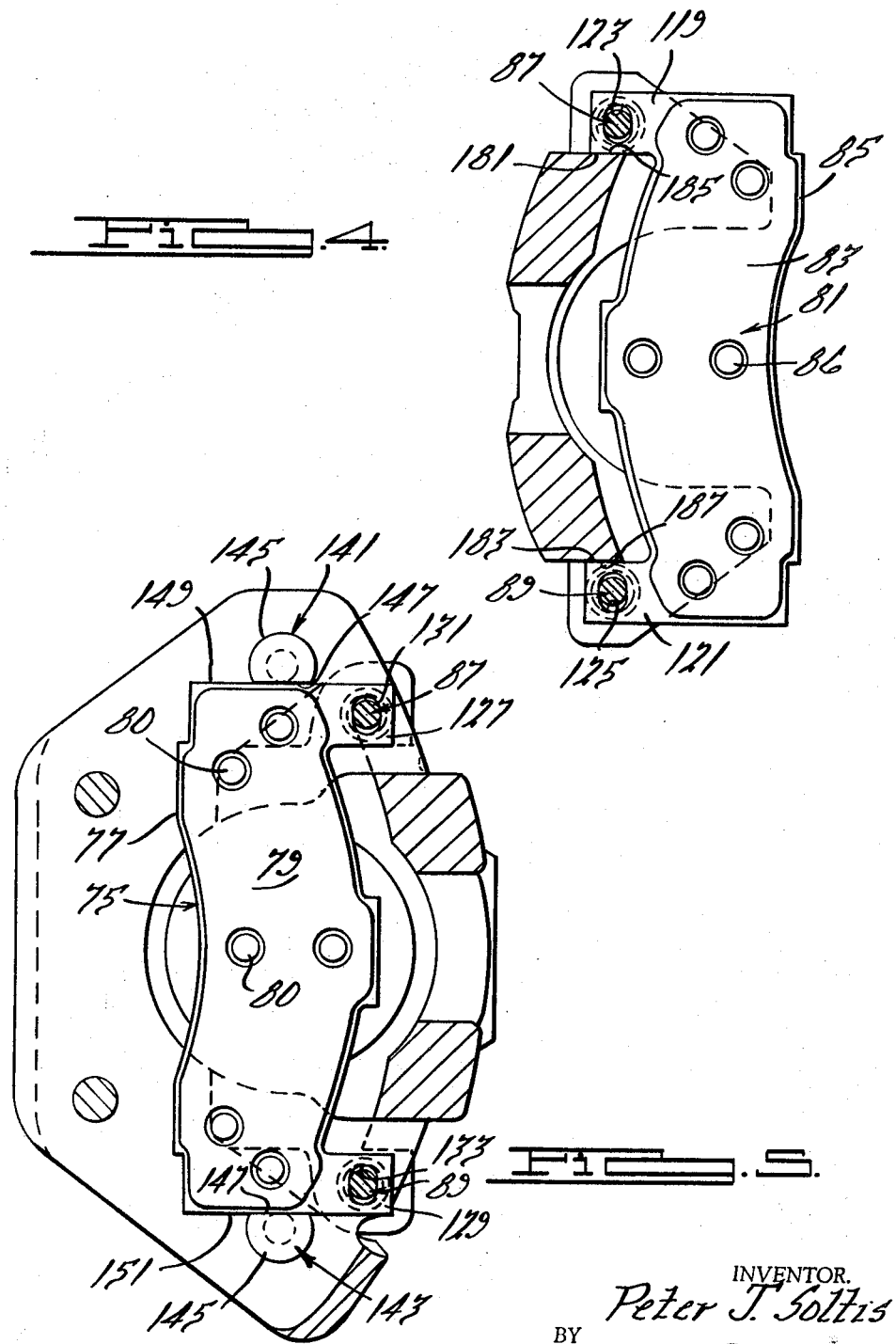

United States Patent Office 3,392,808
Patented July 16, 1968

3,392,808
CALIPER SUPPORT AND RELEASE MECHANISM
Peter J. Soltis, Jr., Detroit, Mich., assignor to Kelsey-Hayes Company, Romulus, Mich., a corporation of Delaware
Filed Feb. 13, 1967, Ser. No. 615,458
6 Claims. (Cl. 188—73)

ABSTRACT OF THE DISCLOSURE

A disk brake of the floating caliper type in which a caliper is slidably supported on a stationary torque plate for movement in a direction generally perpendicular to a rotor to be braked. The caliper is comprised of a fluid motor portion positioned adjacent one of the faces of the disk to be braked and a reaction portion adjacent the other face of the disk to be braked. As the fluid motor portion of the brake is operated, it moves a first brake shoe into engagement with the face of the rotor adjacent the fluid motor portion of the caliper, while the reaction portion moves another brake shoe into engagement with the other face of the rotor to be braked.

Field of the invention

This invention pertains to a sliding caliper type disk brake having resilient means positioned between a fluid motor portion of the caliper and an abutment means for returning the caliper to a neutral or relaxed position after the braking action has been terminated or completed.

Description of the prior art

In many of the prior art disk brakes of the sliding caliper type known to the applicant, the caliper is supported for movement in a direction generally perpendicular to the plane of rotation of a disk to be braked. Means are provided on the caliper that engage a stationary torque plate for preventing rotation of the caliper with respect to the stationary torque plate as the brake shoes operated by the caliper come into engagement with a disk to be braked. Furthermore, in these prior are devices, pin means may be provided that engage the stationary torque plate and the caliper for proper support of the caliper with respect to the torque plate for movement in a plane perpendicular to the plane of rotation of the disk to be braked. Certain of these prior art devices do not include any positive means for returning the caliper from a position where braking operations occur back to a position where the caliper is in a relaxed or neutral position.

The present invention overcomes these difficulties and provides a resilient means for returning the caliper to a neutral or relaxed position after braking operations have been completed.

Summary

The present invention provides, in a disk brake of the sliding caliper type, a resilient means for positively returning the caliper to a neutral or relaxed position when braking action has been completed. When the brakes are actuated, this resilient means is compressed and it stores energy which furnishes a motive force for moving the caliper back to a neutral or relaxed position as the brakes are released. In the preferred embodiment of the invention, this resilient means is positioned between the fluid motor portion of the caliper and an abutment on a pin means extending from the fluid motor portion of the caliper in the direction of movement of the caliper during braking operations.

Moreover, in the preferred embodiment of the invention, a pair of spaced pins is provided which have main body portions held in a stationary torque plate and which extend through spaced bores in the fluid motor portion of the caliper. The fluid motor portion of the caliper is therefore mounted for sliding movement with respect to pins and it moves during braking action in a direction toward the heads of the pins that are located on the side of the fluid motor portion of the caliper opposite the torque plate. Elastomeric O-rings or grommets are positioned between the fluid motor portion of the caliper and the heads of the pins and these elastomeric O-rings or grommets are compressed during braking action. When the brakes are released, these elastomeric O-rings or grommets exert a restoring force on the caliper that returns it to its neutral or relaxed state.

Brief description of the drawings

FIG. 2 is a back elevational view of the disk brake of the present invention;

FIG. 4 is a sectional view taken along the lines 4—4 of FIG. 1;

FIG. 5 is a sectional view taken along the lines 5—5 of FIG. 1; and

Figure 1:
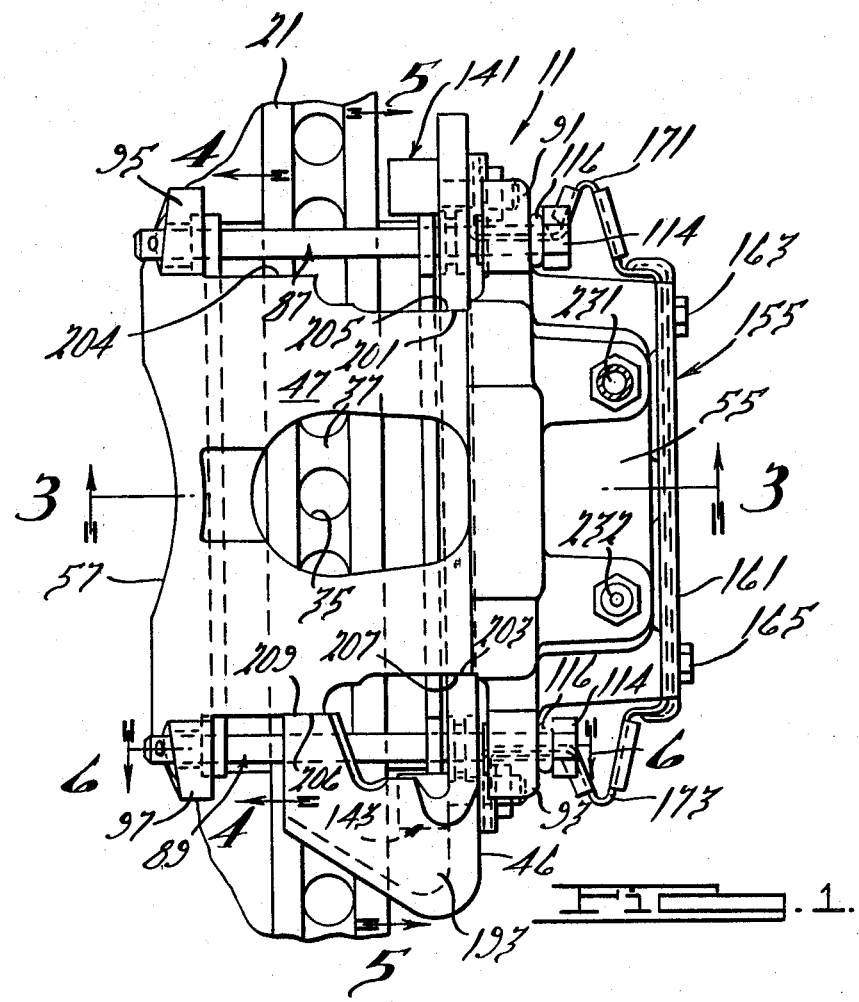
FIGURE 1 is a top plan view of a disk brake of the present invention.

Referring now to the drawings in which like reference numerals designate like parts throughout the several views thereof, a disk brake of the present invention is illustrated generally at 11 in FIGS. 1 through 4, and is shown associated with a vehicle wheel assembly having a hub 13 rotatably mounted on a stationary wheel spindle 15 by bearings 17 and 19. A brake disk or rotor 21 is provided with an attaching flange 23 secured to a flange 25 on the hub 13 by a suitable fastening means, for example, bolt and nut assemblies, one of which is shown at 27. A vehicle wheel 29 is also attached to the flange 25 on the hub by the fastening means 27 through the medium of attaching flange 30.

The brake disk or rotor 21 has a pair of oppositely disposed brake shoe engaging faces 31 and 33 and also has a plurality of radially extending openings 35 that are spaced between webs 37 which serve to move cooling air outwardly through the openings 35 during turning movement of the rotor 21.

A torque plate or fixed reaction member 41 is secured to a support member 42 formed integrally with the spindle 15 by suitable fastening means, for example, a pair of spaced bolts 43 and 45. The torque plate or fixed reaction member 41 has a main body portion 46 that extends in a plane generally parallel to the plane of rotation of the rotary disc 21 and generally parallel to each of the brake shoe engaging faces 31 and 33.

A generally C-shaped housing or caliper 47 is provided with generally opposed legs 55 and 57 disposed on opposite sides of the rotor 21 with the leg 57 disposed in spaced confronting relationship to the rotor face 31 and with the leg 55 disposed in spaced confronting relationship to the rotor face 33. A fluid motor 61 is carried by the caliper leg 55 which forms a fluid motor portion of the caliper and it includes a piston 63 slidably disposed in a cylinder bore 67 formed in the leg 55.

The piston 63 extends between two radially extending legs 71 and 73 of the torque plate or fixed reaction member 41. The outer end of the piston 63 is positioned to engage a brake shoe 75 that includes a backing plate 77 and a brake lining 79 that may be suitably secured thereto, for example, by bonding or by rivets 80 as shown in FIG. 5. Another brake shoe 81, comprised of brake lining 83 and a backing plate 85 suitably bonded to the brake lining 83 or attached thereto by rivets 86, is positioned so that the brake lining 83 is in opposed relationship to the radial face 31 of the rotor 21.

The brake shoes 75 and 81 are slidably supported by the caliper 47 for movement in a direction generally perpendicular to the plane of rotation of the disk 21 and to the rotor faces 31 and 33 through the medium of a pair of pins 87 and 89. For this purpose, the fluid motor portion 55 of the caliper has a pair of outwardly extending flanges 91 and 93 that extend radially outwardly from the fluid motor portion 55. The reaction portion 57 of the caliper also has a pair of radially outwardly extending flanges 95 and 97, with the flange 95 generally aligned axially with the flange 91 on the fluid motor portion 55 and with the flange 97 generally aligned axially with the flange 93 on the fluid motor portion 55.

Figure 6:
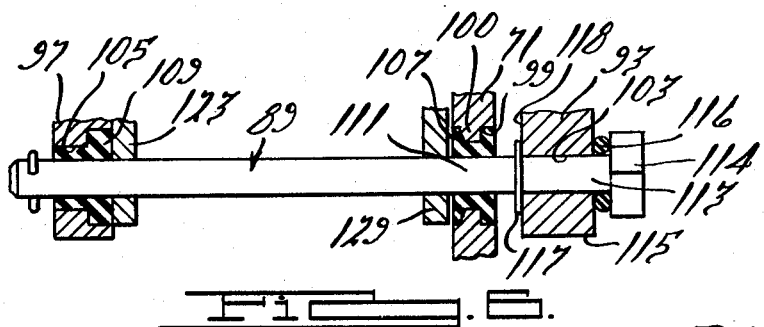
FIG. 6 is a sectional view taken along the lines 6—6 of FIG. 1.

Referring now to FIG. 6, the mounting of the pin 89 is shown in detail. It should be understood that the mounting for the pin 87 is identical and hence the structure for mounting the pin 87 will not be described. As shown, leg 71 of the stationary torque plate 41 has a bore 99 positioned therein with a radially inwardly extending cylindrical flange 100. The bore 99 and the flange 100 are axially aligned with a bore 103 in the flange 93 of the fluid motor portion 55 of the caliper and with a stepped bore 105 positioned in the flange 97 of the reaction portion 57 of the caliper 47. Resilient grommets preferably composed of an elastomeric material and designated by the numerals 107 and 109, respectively, are positioned in the bores 99 and 105, respectively. The grommet 107 receives a central portion 111 of the pin 89, while the grommet 109 receives the other end of the pin 89.

The pin 89 also has a cylindrical end portion 113 positioned in the bore 103 in the radially extending flange 93 of the fluid motor portion 55 of the caliper 47. This end portion terminates in a head 114 that is spaced from the surface 115 of the radially extending flange 93. A resilient means preferably in the form of an elastomeric grommet 116 is positioned between the surface 115 and the head 114 of the pin, and a retaining washer 117 affixed to the cylindrical end portion 113 of the pin 89 is positioned in engagement with the surface 118 of the radially extending flange 93 positioned adjacent the leg 71 of the stationary torque member 46.

The backing plate 85 of the brake shoe 81 has a pair of oppositely disposed upstanding ears 119 and 121, with the upstanding ear 119 having an elongated slot 123 positioned therein and with the ear 121 having an elongated slot 125 positioned therein. Similarly, the backing plate 77 of the brake shoe 75 has a pair of oppositely disposed upstanding ears 127 and 129 that have elongated slots 131 and 133 positioned therein. The elongated slot 123 in the ear 119 of backing plate 85 receives the pin 87 and the pin 87 is similarly received in the elongated slot 131 positioned in the ear 127 of the backing plate 75. On the other hand, the pin 89 is received in the elongated slot 125 in the ear 121 of backing plate 85 and in the elongated slot 133 in the ear 129 in the backing plate 77 of the brake shoe 75.

The pins 87 and 89, therefore, support the backing plates 77 and 85 of the brake shoes 75 and 81 to prevent movement of the brake shoes in a generally vertical radial direction toward the axis of the hub 13 and the spindle 15, while permitting a limited amount of movement in a direction perpendicular thereto. This may permit a small amount of movement of the brake shoes as the brake linings 83 and 79 are engaged with the rotor faces 31 and 33, respectively, during braking operations.

The fixed torque plate 41 carries a pair of spaced studs 141 and 143 in the spaced arms 73 and 71, respectively. Each of these studs is positioned in an aperture in one of the arms 71 or 73 and is affixed thereto by any suitable means, for example, welding. Each stud has an inwardly extending portion 145 and an oppositely extending threaded portion 146. The portion 145 of each of the studs has a face 147 that extends in a plane generally parallel to the edges 149 and 151 of the backing plate 77 to thereby form inwardly extending spaced shoulders arranged generally perpendicular to the disk 21 to absorb the braking torque from the brake lining 79 as it engages the rotor face 33 during braking operations.

The threaded portions 146 of the studs 141 and 143, respectively, are employed to secure a flexible strap 155 to the arms 71 and 73 of the fixed torque plate 41, as can best be seen by reference to FIG. 2. The flexible strap 155 has planar end portions 157 and 159 that have suitable apertures positioned therein that may receive threaded portions 146 of the studs 141 and 143, respectively. A pair of nuts may be threaded over these reduced threaded portions 146 of the studs 141 and 143 to secure these end portions 157 and 159 in engagement directly with the arms 73 and 71 of the stationary torque plate 41.

The flexible strap 155 also has a flat planar central portion 161 that is secured to the fluid motor portion 55 of the caliper 47 by a pair of spaced machine screws 163 and 165. The end portion 157 of the flexible strap 155 is connected to the central portion by a generally U-shaped integrally formed intermediate portion 171, while the end 159 of the flexible strap 155 is joined to the central portion by a generally U-shaped intermediate portion 173. The U-shaped intermediate portions 171 and 173 of the flexible strap are capable of movement so that the U-shaped structure is either narrowed or widened to permit the caliper 47 to move relative to the torque plate 41 during braking operations in a direction generally perpendicular to the disk 21 and to the brake shoe engaging faces 31 and 33, respectively, of this rotor. It can be appreciated that the structure of the flexible strap 155 is such that the generally planar end sections 157 and 159 and the central portion 161 lie in planes generally parallel to the plane of the disk 21 and thereby provide column support in a radial direction with respect to the axis of the hub 13 and axle 15 to resist movement of the caliper relative to the disk in any direction except in a direction that is generally perpendicular to the disk.

The ears 119 and 121 of the backing plate 85 of the brake shoe 81 have opposed inwardly extending surfaces 181 and 183 that extend in a direction generally perpendicular to the disk 121 and that are engageable with complementary edges or shoulders 185 and 187 on the reaction portion 57 of the caliper 47, during braking operations. This serves to transfer the braking torque absorbed by the lining 83 from the braking surface 31 to the reaction portion 57 of the caliper 47.

The fixed torque plate 41 has means thereon that are engageable with the caliper 47 intermediate the fluid motor portion 55 and the reaction portion 57 to prevent rotation of the caliper 47 with respect to the torque plate 41 and to prevent and resist the twisting couple exerted on the caliper 47 during braking operations.

This means preferably comprises a pair of axially extending flanges one of which is shown at 193 that extend in an axial direction from and are integrally formed with the spaced arms 71 and 73, respectively, of the torque plate 41. The axially extending flanges have means positioned thereon for engaging the caliper 47 adjacent the brake shoe 75 and intermediate the reaction portion 57 and the fluid motor portion 55 of the caliper 47. As can best be seen by reference to FIGURE 5, this means includes spaced shoulders 201 and 203 on the main body portion 46 of the torque plate 41 that are positioned in sliding engagement with the complementary outwardly positioned surfaces 205 and 207 positioned on the fluid motor portion 55 of the caliper 57 adjacent the brake shoe 75.

The axially extending flanges, one of which is shown at 193, also have inwardly extending abutment surfaces that form inwardly spaced shoulders, one of which is shown at 209, arranged generally perpendicularly to the disk 21. These spaced shoulders are positioned in engagement with complementary circumferentially spaced axially extending shoulders 204 and 206 positioned intermediate the reaction portion 57 and the fluid motor portion 55 of the caliper 47. The engagement of the spaced shoulders 201 and 203 on the main body portion 46 of the torque plate 41 prevents relative rotation between the caliper 47 and the stationary torque plate 41 and simultaneously permits sliding movement between the caliper and the torque plate. The spaced shoulders 204 and 206 formed on the caliper 47 are adapted to engage circumferentially inwardly extending means in the form of spaced axially extending shoulders, one of which is shown at 209. These shoulders on the axially extending flanges of the torque plate 46 with the spaced complementary shoulders on the caliper 47 provide a means for preventing twisting of the caliper relative to the torque plate when the twisting couple is produced on the caliper by the engagement of the brake shoes with the opposed faces of the disk to be braked during braking operations.

The fluid motor 61 is provided with a suitable source of hydraulic fluid that may be fed into the cylinder 67 by means of a fitting 231 positioned in the wall of the cylinder 67. A bleed fitting 232 is also positioned in the wall of the cylinder 67 to bleed off brake fluid after braking operations are completed. A rectangular shaped O-ring seal 233 of the conventional type is carried by the cylinder 67 and is positioned in engagement with the piston 63 to provide a seal between the cylinder 67 and the piston 63. It also acts to exert a restoring force on the piston 63 after braking operations have been completed as is conventional in braking systems of this type. It can be appreciated that during braking operations hydraulic fluid under pressure is fed into the cylinder 67 through the fitting 231 thereby forcing the piston 63 to the left, as viewed in FIGURE 3, causing movement of the brake shoe 75 to the left through the engagement of the piston 63 with the backing plate 77. This forces the brake lining 79 into braking engagement with the braking face 33 of the rotor 21. The introduction of hydraulic fluid into the cylinder 67 also moves the caliper 47 to the right as shown in FIGURE 3 so that the reaction portion 57 moves the brake shoe 81 to the right as viewed in FIGURE 3 thereby bringing the brake lining 83 into engagement with the braking face 31 of the rotor 21 with the braking force.

Figure 3:
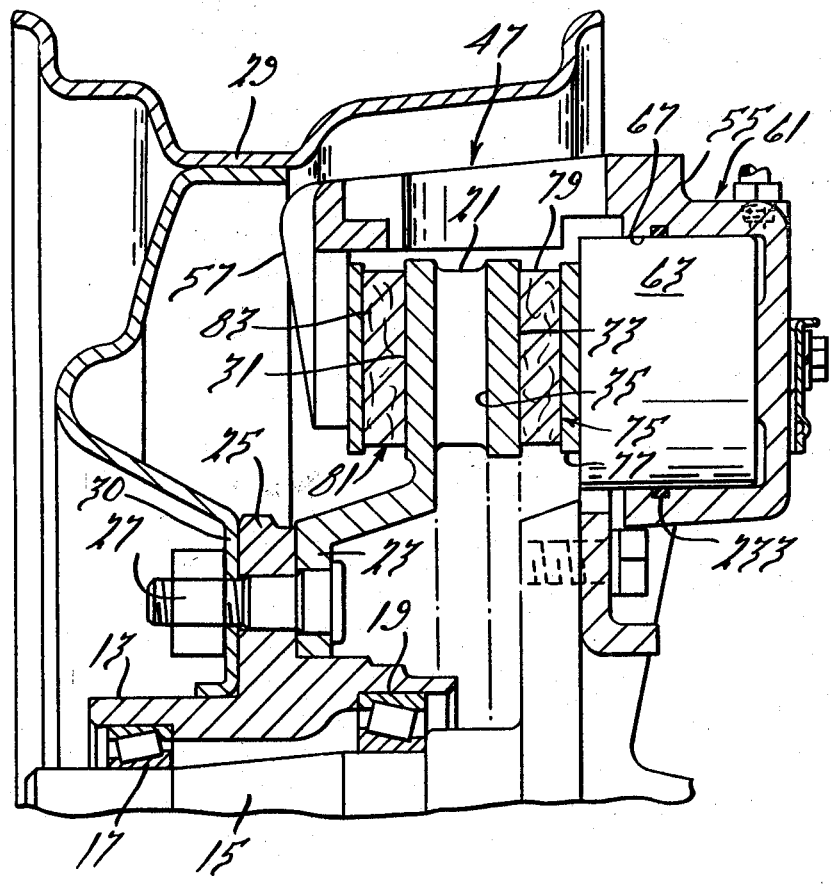
FIG. 3 is a sectional view taken along the lines 3—3 of FIG. 1.

The movement of the caliper 47 relative to the fixed torque plate 41 to the right, as shown in FIGURES 1 and 3 is permitted by the flexing of the U-shaped portions or hinges 171 and 173 of the flexible strap 155 by the sliding movement of the fluid motor portion 55 of the caliper 47 on the pin means 87 and 89. This action will be described in more detail subsequently.

As previously pointed out, the braking torque absorbed by the brake shoe 75 is transferred to the main body portion 46 of the torque plate through the studs 141 and 143. The braking torque of the second brake shoe 81 is transferred to the reaction portion 57 of the caliper 47 through the opposed surfaces 181 and 183 positioned on the backing plate 85 of the brake shoe 81 which comes into engagement with the complementary surfaces 185 and 187 on the reaction portion 57 of the caliper 47.

Referring now to FIGURE 6 which shows the mounting of the pin 89 in the leg 71 of the stationary torque plate 41 and in the radially extending flange 97 of the reaction portion 57 of the caliper 47, it can be appreciated that the grommets 109 and 107 resiliently grip the pin 89 in the radially extending flange 97 of the reaction portion 57 and in the arm 71 of the stationary torque plate 41, respectively, and that the flange 93 of the fluid motor portion 55 is slidably mounted on the cylindrical end 113 of the pin 89.

It can be appreciated that during braking operations, the caliper 47 moves to the right as viewed in FIGURES 1, 3 and 6 due to the reaction force of the hydraulic fluid admitted behind the piston 63, as shown in FIGURE 3. This action compresses the resilient means 116 in the form of the elastomeric grommet between the surface 115 of the radially extending flange 93 and the head 114 of the pin 89, thereby exerting a positively acting restoring force on the caliper 47 that will move this caliper back to a neutral position when the brakes are released. The movement of the caliper 47 to the left, as viewed in FIGURES 1 and 6, is limited by the abutment means 117 affixed to the cylindrical portion 111 of the pin 89.

It can be appreciated, therefore, that the present invention provides an extremely effective, inexpensive and compact means for restoring a caliper to a neutral position after the hydraulic pressure that is applied to a fluid motor portion of the caliper is released and the braking mechanism is restored to a neutral position.

What is claimed is:

1. A disk brake adapted to brake a rotary disk, said disk brake comprising a stationary torque plate held against rotation relative to the disk, a caliper having a fluid motor portion adapted to be positioned on one side of the disk, a reaction portion adapted to be positioned on the other side of the disk and a central portion connecting said fluid motor portion with said reaction portion, first and second brake shoes juxtaposed to said fluid motor portion and to said reaction portion, respectively, interengaging means on said caliper and on said torque plate for supporting said caliper for sliding movement relative to said torque plate in a direction generally perpendicular to the plane of rotation of the disk and for holding said caliper against rotation about the axis of the disk, a fluid motor carried by said fluid motor portion of said caliper for urging said first brake shoe into frictional engagement with the disk and for generating a reactive force upon said caliper for sliding said caliper in said perpendicular direction for transmitting said movement from said reaction portion of said caliper into movement of said second brake pad into frictional engagement with the disk, a pair of spaced pin means, means for fixing said pin means intermediate their ends against substantial axial movement relative to said torque plate with said pin means extending substantially perpendicularly with respect to the palne of rotation of the disk, one end of each of said pin means being supportingly engaged with said reaction portion of said caliper, abutment means on the other end of each of said pin means spaced from said fluid motor portion of said caliper, and resilient means interposed between said fluid motor portion of said caliper and the abutment means of each of said pin means for resilient deflection upon sliding movement of said caliper and for exerting a restoring force upon said caliper when said fluid motor means is released.

2. The combination as set forth in claim 1 wherein the intermediate portion of the pin means is held against substantial axial movement relative to the torque plate by means of resilient grommets encircling said pin means and affixed to said torque plate.

3. The combination as set forth in claim 1 wherein each of the brake shoes comprises a frictional lining and a backing plate, the backing plates of each of said brake shoes being apertured with the pin means extending through said apertures for supporting said brake shoes.

4. The combination as set forth in claim 1 wherein the torque plate extends at least in part between the fluid motor portion of the caliper and the adjacent side of the disk.

5. The combination of claim 1 in which said resilient means comprises a separate O-ring of elastomeric material positioned about each of said pin means and between said fluid motor portion of said caliper and said abutment means on said pin means.

6. The combination of claim 5 in which said abutment means comprise heads on said pin means.

References Cited

UNITED STATES PATENTS

| | | | |
|---|---|---|---|
| 2,319,231 | 5/1943 | Hawley | 188—73 |
| 2,351,041 | 6/1944 | Hawley | 188—73 X |
| 3,199,635 | 8/1965 | Bessler et al. | 188—73 |
| 3,334,708 | 8/1967 | Swift | 188—73 |

MILTON BUCHLER, *Primary Examiner.*

GEORGE E. A. HALVOSA, *Examiner.*